(12) United States Patent
Ohno et al.

(10) Patent No.: US 11,745,686 B2
(45) Date of Patent: Sep. 5, 2023

(54) SEAT-MOUNTED AIRBAG DEVICE

(71) Applicant: TOYOTA JIDOSHA KABUSHIKI KAISHA, Toyota (JP)

(72) Inventors: Mitsuyoshi Ohno, Miyoshi (JP); Jiro Ohachi, Sunto-gun Shizuoka-ken (JP); Masashi Hotta, Hashima-gun Gifu-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/950,633

(22) Filed: Sep. 22, 2022

(65) Prior Publication Data
US 2023/0114149 A1 Apr. 13, 2023

(30) Foreign Application Priority Data
Oct. 8, 2021 (JP) .................................. 2021-166464

(51) Int. Cl.
*B60R 21/207* (2006.01)
*B60R 21/231* (2011.01)

(52) U.S. Cl.
CPC ...... *B60R 21/207* (2013.01); *B60R 21/23138* (2013.01); *B60R 2021/2074* (2013.01); *B60R 2021/23161* (2013.01)

(58) Field of Classification Search
None
See application file for complete search history.

(56) References Cited

U.S. PATENT DOCUMENTS

| | | | |
|---|---|---|---|
| 6,120,099 A | 9/2000 | Reikeraas et al. | |
| 8,485,553 B1 | 7/2013 | Kühne et al. | |
| 8,985,622 B1 | 3/2015 | Cannon | |
| 10,543,801 B2 * | 1/2020 | Kwon ............... | B60R 21/23138 |

(Continued)

FOREIGN PATENT DOCUMENTS

| | | |
|---|---|---|
| CN | 102582565 A | 7/2012 |
| DE | 102014201474 A1 | 7/2015 |

(Continued)

OTHER PUBLICATIONS

Non-Final Office Action dated Feb. 7, 2023 to U.S. Appl. No. 17/706,032, filed Mar. 28, 2022.

(Continued)

*Primary Examiner* — Faye M Fleming
(74) *Attorney, Agent, or Firm* — Dinsmore & Shohl LLP

(57) ABSTRACT

A seat-mounted airbag device includes a guidance member and an airbag body which includes a front-rear chamber and a distal-end chamber and is accommodated in a side portion of a headrest of a window-side vehicle seat in a state where the airbag body includes an outward winding portion. At the time of a front end collision, the front-rear chamber deploys from the side portion through a gap between the head of an occupant sitting on the window-side vehicle seat and the head of an occupant sitting on a central-side vehicle seat and is disposed in the gap. The distal-end chamber deploys inwardly from a front end part of the front-rear chamber. The guidance member projects from the side portion prior to the deployment of the airbag body so as to be disposed between the airbag body and the head of the occupant sitting on the central-side vehicle seat.

6 Claims, 10 Drawing Sheets

(56) References Cited

U.S. PATENT DOCUMENTS

| | | | |
|---|---|---|---|
| 2006/0131847 A1 | 6/2006 | Sato et al. | |
| 2012/0242067 A1 | 9/2012 | Kino et al. | |
| 2013/0234421 A1 | 9/2013 | Honda et al. | |
| 2014/0284907 A1 | 9/2014 | Akiyama | |
| 2016/0082915 A1 | 3/2016 | Madaras | |
| 2018/0236962 A1 | 8/2018 | Ohno et al. | |
| 2019/0176739 A1 | 6/2019 | Song | |
| 2019/0225184 A1 | 7/2019 | Ohno | |
| 2022/0355758 A1* | 11/2022 | Freisler | B60R 21/207 |
| 2022/0396231 A1 | 12/2022 | Ohno et al. | |
| 2022/0396233 A1* | 12/2022 | Ohno | B60R 21/2338 |
| 2023/0010582 A1* | 1/2023 | Ohachi | B60N 2/888 |
| 2023/0064279 A1 | 3/2023 | Ohno et al. | |

FOREIGN PATENT DOCUMENTS

| | | | | |
|---|---|---|---|---|
| DE | 102018104392 A1 * | 8/2019 | | B60R 21/23138 |
| DE | 102019103484 A1 * | 8/2019 | | B60R 21/23138 |
| DE | 102020109466 A1 * | 4/2021 | | |
| DE | 102020118337 A1 * | 1/2022 | | |
| DE | 102020118339 A1 * | 1/2022 | | |
| DE | 102020123629 A1 * | 3/2022 | | |
| JP | 2000-062562 A | 2/2000 | | |
| JP | 2002-211338 A | 7/2002 | | |
| JP | 2006008105 A | 1/2006 | | |
| JP | 2010-076640 A | 4/2010 | | |
| JP | 2013018378 A | 1/2013 | | |
| JP | 2014-184805 A | 10/2014 | | |
| JP | 2019127101 A | 8/2019 | | |
| JP | 2021-049898 A | 4/2021 | | |
| KR | 10-20080003201 A | 1/2008 | | |
| KR | 20200075065 A * | 6/2020 | | |
| WO | 2016174785 A1 | 11/2016 | | |
| WO | 2017099398 A1 | 6/2017 | | |
| WO | WO-2019121222 A1 * | 6/2019 | | |
| WO | 2019-166268 A1 | 9/2019 | | |
| WO | 2021121737 A1 | 6/2021 | | |
| WO | 2022/053331 A1 | 3/2022 | | |

OTHER PUBLICATIONS

Non-Final Office Action dated Feb. 7, 2023 to U.S. Appl. No. 17/712,703, filed Apr. 4, 2022.

Non-Final Office Action dated Feb. 7, 2023 to U.S. Appl. No. 17/728,446, filed Apr. 25, 2022.

Notice of Allowance dated Apr. 14, 2023, Issued to U.S. Appl. No. 17/712,703, filed Apr. 4, 2022.

Notice ot Allowance dated Apr. 17, 2023, Issued to U.S. Appl. No. 17/728,446, filed Apr. 25, 2022.

Notice of Allowance dated Apr. 18, 2023, Issued to U.S. Appl. No. 17/706,032, filed Mar. 28, 2022.

* cited by examiner

SEAT-MOUNTED AIRBAG DEVICE

CROSS-REFERENCE TO RELATED APPLICATION

This application claims priority to Japanese Patent Application No. 2021-166464 filed on Oct. 8, 2021, incorporated herein by reference in its entirety.

BACKGROUND

1. Technical Field

The present disclosure relates to a seat-mounted airbag device.

2. Description of Related Art

There has been conventionally known a far-side airbag device including a first chamber, a second chamber, a third chamber, and a tether (e.g., see Japanese Unexamined Patent Application Publication No. 2021-049898 (JP 2021-049898 A)). At the time of an oblique side collision or a side collision of a vehicle, the first chamber deploys from a first side part of a seatback toward its adjacent seatback, the first side part being on a far side from a side where a shoulder belt is provided. The second chamber deploys forward in a seat front-rear direction from a front end part of the first chamber upon receipt of gas supply. The third chamber deploys inwardly in a seat width direction from a front end part of the second chamber upon receipt of gas supply. The tether connects the first chamber and the third chamber to each other.

SUMMARY

In a case where the far-side airbag device described above is applied to a rear seat having a central seat, for example, an airbag develops between an occupant sitting on a window-side vehicle seat and an occupant sitting on a central-side vehicle seat. In this case, it is necessary to deploy the airbag such that the airbag does not hit either of the head of the occupant sitting on the window-side vehicle seat and the head of the occupant sitting on the central-side vehicle seat.

However, the gap between the head of the occupant sitting on the window-side vehicle seat and the head of the occupant sitting on the central-side vehicle seat is narrow. Accordingly, there is such a possibility that, when the airbag deploys, the airbag might hit (interfere with) the head of the occupant sitting on the central-side vehicle seat. That is, there is such a possibility that the airbag might not be able to deploy smoothly. Thus, there is room for improvement in the airbag device in which the airbag develops through the gap between the head of the occupant sitting on the window-side vehicle seat and the head of the occupant sitting on the central-side vehicle seat.

In view of this, an object of the present disclosure is to provide a seat-mounted airbag device in which an airbag body develops smoothly even when the gap between the head of an occupant sitting on a window-side vehicle seat and the head of an occupant sitting on a central-side vehicle seat is narrow.

In order to achieve the above object, a seat-mounted airbag device according to a first aspect of the present disclosure includes an airbag body and a guidance member. The airbag body includes a front-rear chamber and a distal-end chamber and is accommodated in a side portion in a state where the airbag body includes an outward winding portion wound outwardly in a roll shape with its axial direction being along the seat up-down direction. The side portion is provided on an outer side, in a seat width direction, of a headrest of a window-side vehicle seat, the outer side being a far side from a window side. The front-rear chamber is configured to, due to gas emitted from an inflator actuated in response to detection or prediction of a front end collision of a vehicle, deploy forward in a seat front-rear direction from the side portion such that the front-rear chamber passes through a gap between the head of an occupant sitting on the window-side vehicle seat and the head of an occupant sitting on a central-side vehicle seat and is disposed in the gap. The distal-end chamber is configured to deploy inwardly in the seat width direction from a front end part of the front-rear chamber in the seat front-rear direction such that the distal-end chamber is disposed in front of the head of the occupant sitting on the window-side vehicle seat in the seat front-rear direction. The guidance member is configured to project from the side portion prior to the deployment of the airbag body such that the guidance member is disposed between the airbag body and the head of the occupant sitting on the central-side vehicle seat.

In the present disclosure according to the first aspect, when the inflator is actuated in response to detection or prediction of a front end collision of the vehicle, the front-rear chamber of the airbag body deploys forward in the seat front-rear direction through the gap between the head of the occupant sitting on the window-side vehicle seat and the head of the occupant sitting on the central-side vehicle seat such that the front-rear chamber is disposed in the gap. After that, the distal-end chamber of the airbag body deploys inwardly in the seat width direction from the front end part of the front-rear chamber in the seat front-rear direction such that the distal-end chamber is disposed in front of the head of the occupant sitting on the window-side vehicle seat in the seat front-rear direction, and hereby, the head of the occupant is restricted.

Here, the airbag body accommodated in the side portion provided on the outer side of the headrest in the seat width direction, the outer side being a far side from the window side, includes the outward winding portion wound outwardly in a roll shape with its axial direction being along the seat up-down direction. The guidance member projects from the side portion prior to the deployment of the airbag body such that the guidance member is disposed between the airbag body and the head of the occupant sitting on the central-side vehicle seat.

Accordingly, at the time when the airbag body deploys forward in the seat front-rear direction through the gap between the head of the occupant sitting on the window-side vehicle seat and the head of the occupant sitting on the central-side vehicle seat due to gas emitted from the inflator, the airbag body deploys inwardly from the guidance member in the seat width direction while the outward winding portion wound outwardly in a roll shape is loosening.

Accordingly, even in a case where the gap between the head of the occupant sitting on the window-side vehicle seat and the head of the occupant sitting on the central-side vehicle seat is narrow, it is possible to restrain the airbag body from hitting (interfering with) the head of the occupant sitting on the window-side vehicle seat and the head of the occupant sitting on the central-side vehicle seat, and the airbag body deploys smoothly by being guided by the guidance member.

Further, a seat-mounted airbag device according to a second aspect of the present disclosure includes an airbag body and guidance members. The airbag body includes a front-rear chamber and a distal-end chamber and is accommodated in a side portion in a state where the airbag body includes a bellows portion folded in a bellows shape. The side portion is provided on an outer side, in a seat width direction, of a headrest of a window-side vehicle seat, the outer side being a far side from a window side. The front-rear chamber is configured to, due to gas emitted from an inflator actuated in response to detection or prediction of a front end collision of a vehicle, deploy forward in a seat front-rear direction from the side portion such that the front-rear chamber passes through a gap between the head of an occupant sitting on the window-side vehicle seat and the head of an occupant sitting on a central-side vehicle seat and is disposed in the gap. The distal-end chamber is configured to deploy inwardly in the seat width direction from a front end part of the front-rear chamber in the seat front-rear direction such that the distal-end chamber is disposed in front of the head of the occupant sitting on the window-side vehicle seat in the seat front-rear direction. The guidance members are configured to project from the side portion prior to deployment of the airbag body such that a first one of the guidance members is disposed between the airbag body and the head of the occupant sitting on the window-side vehicle seat, and a second one of the guidance members is disposed between the airbag body and the head of the occupant sitting on the central-side vehicle seat.

In the present disclosure according to the second aspect, when the inflator is actuated in response to detection or prediction of a front end collision of the vehicle, the front-rear chamber of the airbag body deploys forward in the seat front-rear direction through the gap between the head of the occupant sitting on the window-side vehicle seat and the head of the occupant sitting on the central-side vehicle seat such that the front-rear chamber is disposed in the gap. After that, the distal-end chamber of the airbag body deploys inwardly in the seat width direction from the front end part of the front-rear chamber in the seat front-rear direction such that the distal-end chamber is disposed in front of the head of the occupant sitting on the window-side vehicle seat in the seat front-rear direction, and hereby, the head of the occupant is restricted.

Here, the airbag body accommodated in the side portion provided on the outer side of the headrest in the seat width direction, the outer side being a far side from the window side, includes the bellows portion folded in a bellows shape. The guidance members project from the side portion prior to the deployment of the airbag body such that the first one of the guidance members is disposed between the airbag body and the head of the occupant sitting on the window-side vehicle seat and the second one of the guidance members is disposed between the airbag body and the head of the occupant sitting on the central-side vehicle seat.

Accordingly, at the time when the airbag body deploys forward in the seat front-rear direction through the gap between the head of the occupant sitting on the window-side vehicle seat and the head of the occupant sitting on the central-side vehicle seat due to gas emitted from the inflator, the airbag body deploys while the bellows portion folded in a bellow shape is loosening between the guide member placed on a side closer to the head of the occupant sitting on the window-side vehicle seat and the guide member placed on a side closer to the head of the occupant sitting on the central-side vehicle seat.

Accordingly, even in a case where the gap between the head of the occupant sitting on the window-side vehicle seat and the head of the occupant sitting on the central-side vehicle seat is narrow, it is possible to restrain the airbag body from hitting (interfering with) the head of the occupant sitting on the window-side vehicle seat and the head of the occupant sitting on the central-side vehicle seat, so that the airbag body smoothly deploys by being guided by the guidance members. Further, generally, it is known that the bellows shape loosens more quickly than the roll shape. Accordingly, the airbag body can deploy quickly in comparison with a case where the airbag body is accommodated in a state where the airbag body includes the outward winding portion.

Further, a seat-mounted airbag device according to a third aspect may be configured as follows. That is, in the seat-mounted airbag device according to the first aspect, the airbag body accommodated in the side portion may include a bellows portion folded in a bellows shape continuously with the outward winding portion toward the upstream side from the outward winding portion in the deployment direction of the airbag body.

In the present disclosure according to the third aspect, the airbag body accommodated in the side portion includes the bellows portion folded in a bellows shape continuously with the outward winding portion toward the upstream side from the outward winding portion in the deployment direction of the airbag body. Accordingly, at the time when the airbag deploys forward in the seat front-rear direction through the gap between the head of the occupant sitting on the window-side vehicle seat and the head of the occupant sitting on the central-side vehicle seat due to gas emitted from the inflator, the bellows portion loosens and deploys first, and then, the outward winding portion loosens and deploys. Here, generally, it is known that the bellows shape loosens more quickly than the roll shape. Accordingly, the airbag body can deploy quickly in comparison with a case where the airbag body includes only the outward winding portion.

Further, a seat-mounted airbag device according to a fourth aspect may be configured as follows. That is, in the seat-mounted airbag device according to any one of the first to third aspects, the guidance member may be made of fabric.

In the present disclosure according to the fourth aspect, the guidance member is made of fabric. Accordingly, in comparison with a case where the guidance member is made of plastic, even when the guidance member hits (interferes with) the head of the occupant sitting on the central-side vehicle seat, the head is hardly damaged.

Further, a seat-mounted airbag device according to a fifth aspect may be configured as follows. That is, in the seat-mounted airbag device according to any one of the first to third aspects, the guidance member disposed between the airbag body and the head of the occupant sitting on the central-side vehicle seat may be constituted by a front wall of the side portion. The front wall may be configured to be opened, by a stopper member, only to a predetermined angle that allows the airbag body to deploy.

In the present disclosure according to the fifth aspect, the guidance member is constituted only by the front wall of the side portion. Accordingly, in comparison with a case where the guidance member is provided separately from the side portion, the manufacturing cost of the guidance member is reduced. Further, the front wall is configured to be opened, by the stopper member, only to the predetermined angle at which the airbag body can deploy. Accordingly, it is possible to prevent such a situation that the front wall is opened at an angle larger than the predetermined angle and hits and damages the head of the occupant sitting on the central-side vehicle seat.

Further, a seat-mounted airbag device according to a sixth aspect may be configured as follows. That is, in the seat-mounted airbag device according to the fifth aspect, the guidance member disposed between the airbag body and the head of the occupant sitting on the central-side vehicle seat may be constituted by the front wall and fabric provided in the front wall.

In the present disclosure according to the sixth aspect, the guidance member is constituted by the front wall of the side portion and the fabric provided in the front wall. Accordingly, in comparison with a case where the guidance member is made of only fabric, the manufacturing cost of the guidance member is reduced. Further, in comparison with a case where the guidance member is constituted only by the front wall of the side portion, it is possible to guide the airbag body to deploy to an appropriate region ahead of the front wall in the seat front-rear direction.

Thus, with the present disclosure, even in a case where the gap between the head of the occupant sitting on the window-side vehicle seat and the head of the occupant sitting on the central-side vehicle seat is narrow, it is possible to smoothly deploy the airbag body.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
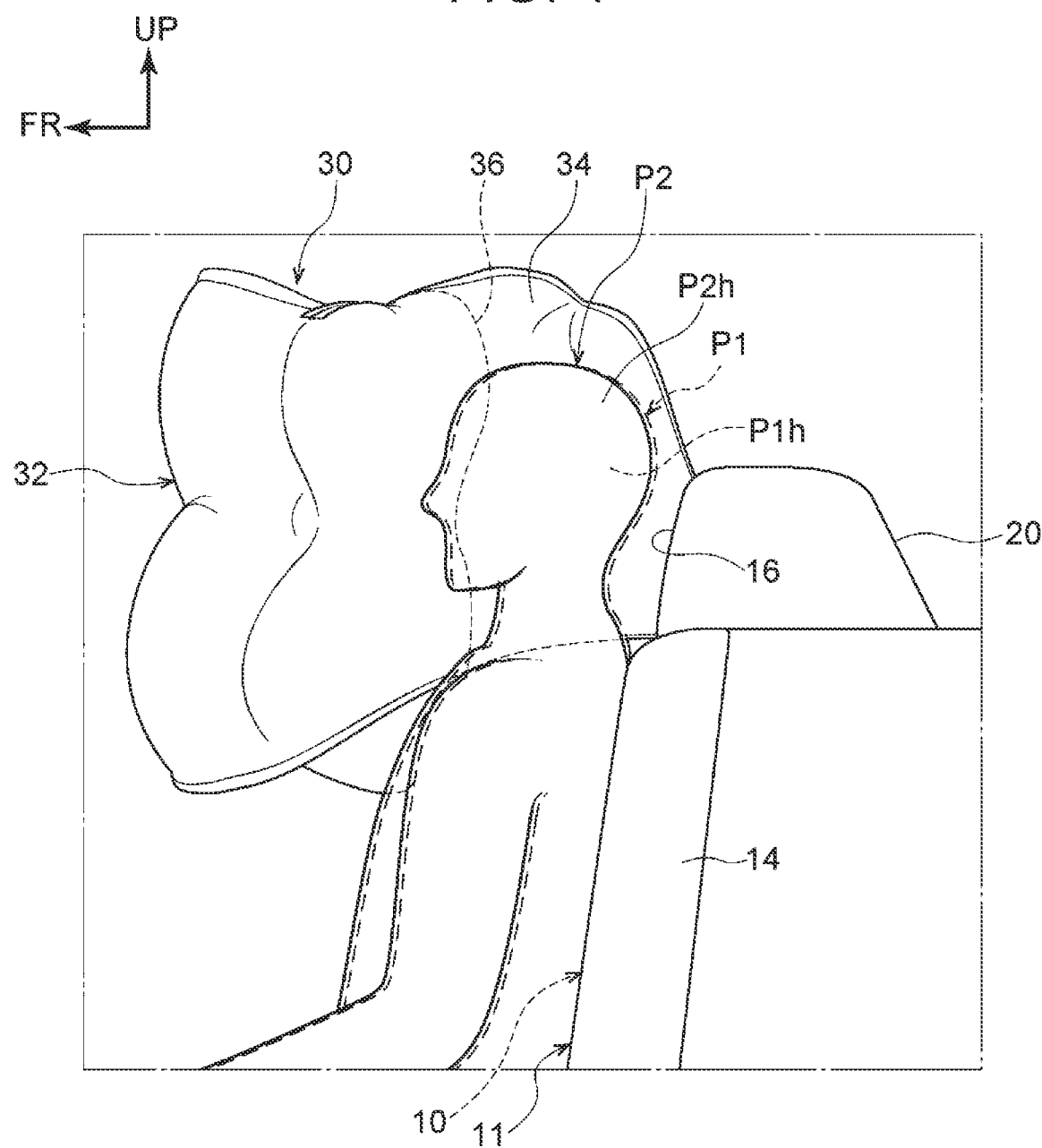
FIG. 1 is a side view illustrating a state after the deployment of a seat-mounted airbag device according to a first embodiment.

The following describes embodiments of the present disclosure in detail with reference to the drawings. Note that, for convenience of description, in each of the drawings, an arrow UP indicates the upper side in a seat up-down direction, an arrow FR indicates the front side in a seat front-rear direction, and an arrow RH indicates the right side in a seat right-left direction. Accordingly, when the upper and lower sides, the front and rear sides, and the right and left sides are described in the following description without any special mention, they indicate the upper and lower sides of a vehicle seat, the front and rear sides of the vehicle seat, and the right and left sides of the vehicle seat. Further, the right-left direction is synonymous with a seat width direction.

Further, a seat-mounted airbag device (hereinafter just referred to as the "airbag device") 30 according to the present embodiment is provided inside a casing portion 20 (described later) constituting a headrest 16 of a window-side vehicle seat 10 among rear seats including a central seat (a central-side vehicle seat 11) of a vehicle. Accordingly, the vehicle seats 10, 11 according to the present embodiment are described as rear seats. However, the vehicle seats 10, 11 are not limited to the rear seats, provided that a central seat is provided between window-side seats.

Further, the vehicle seats 10, 11 according to the present embodiment are provided as a bench seat connected integrally. However, the following description is also applicable to a case where the window-side vehicle seat 10 and the central-side vehicle seat 11 are provided as independent seats that are not connected integrally. Further, the vehicle seat 10 and the vehicle seat 11 are configured similarly except for the headrest 16. Accordingly, their configurations will be described based on the configuration of the vehicle seat 10.

Further, in the present embodiment, an occupant sitting on the window-side vehicle seat 10 is referred to as a window-side occupant P1, and an occupant sitting on the central-side vehicle seat 11 is referred to as a central-side occupant P2. Note that, in the present embodiment, the "window-side occupant P1" and the "central-side occupant P2" are occupants corresponding to an AM50 dummy, for example.

First Embodiment

Figure 2:
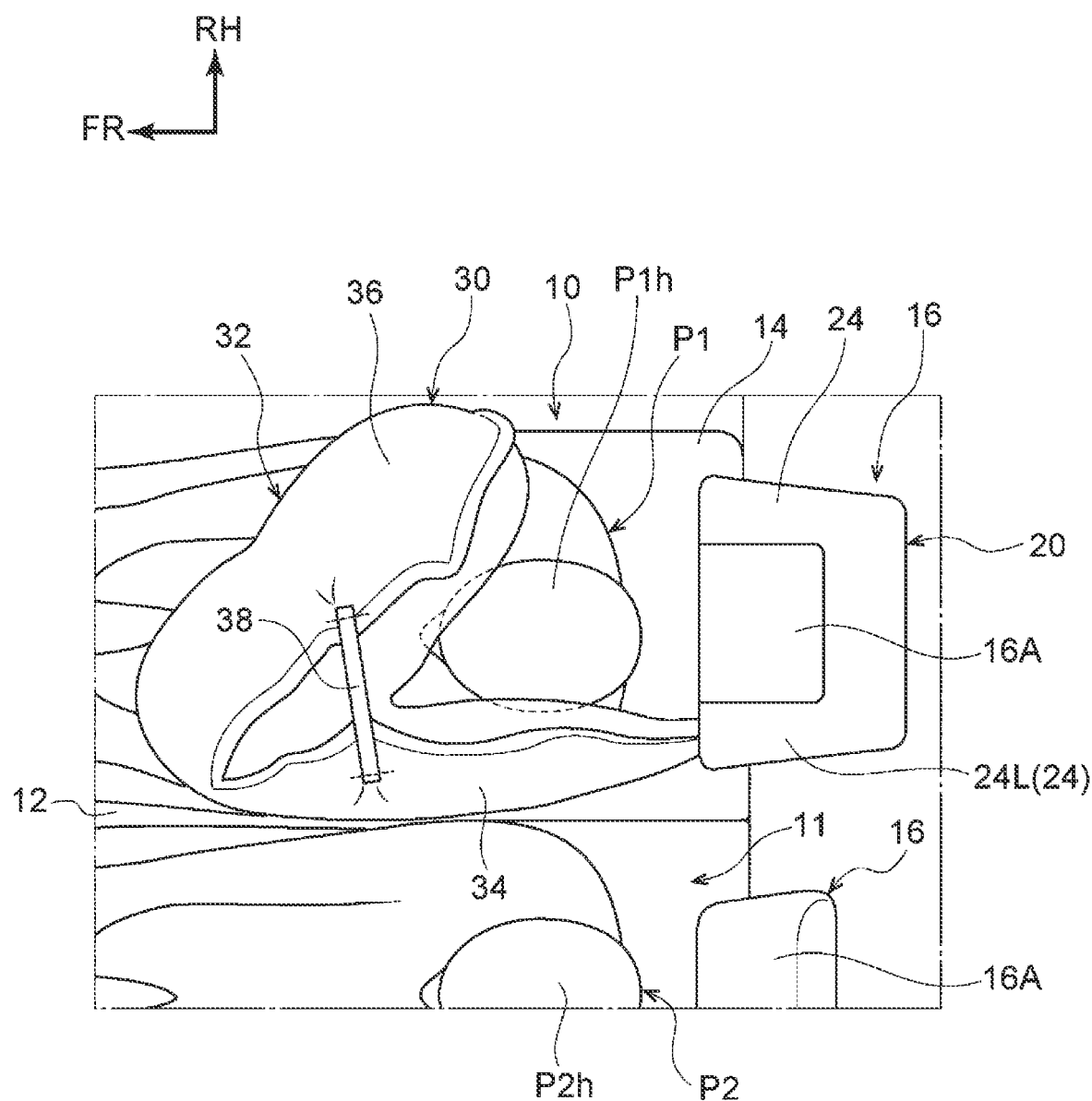
FIG. 2 is a plan view illustrating the state after the deployment of the seat-mounted airbag device according to the first embodiment.

First described is the airbag device 30 according to a first embodiment. As illustrated in FIGS. 1, 2, the vehicle seat 10 on which the window-side occupant P1 sits includes a seat cushion 12 configured to support the bottom and the tights of the window-side occupant P1, a seatback 14 configured to support the back of the window-side occupant P1, and the headrest 16 configured to support a head P1$h$ of the window-side occupant P1.

The headrest 16 includes a block-shaped main body portion 16A provided in the center, in the seat width direction, of an upper end part of the seatback 14 in a vertically movable manner. More specifically, a pair of right and left columnar stays (not illustrated) is provided in the center, in the seat width direction, of the lower face of the main body portion 16A.

A pair of right and left generally-cylindrical headrest supports 18 (see FIGS. 3, 4) is provided in the center, in the seat width direction, of the upper end part of the seatback 14, and the stays are passed through the headrest supports 18 in a vertically movable manner such that the stays are fixable at a plurality of predetermined positions. Note that the headrest 16 of the vehicle seat 11 is constituted only by the main body portion 16A.

The headrest 16 of the vehicle seat 10 includes the casing portion 20 continuously provided toward the right and left sides of the main body portion 16A from the rear side of the main body portion 16A. That is, the casing portion 20 is formed in a generally "U" shape opened forward in a plan view and is attached to the main body portion 16A, and the main body portion 16A is placed inside the casing portion 20 substantially without any gap.

Note that, in the casing portion 20, respective front end surfaces (the outer surface of a front wall 20F) of the right and left side portions 24 extending in the front-rear direction are generally flush with the front face of the main body portion 16A (see FIGS. 2, 3), and the front end surfaces can also support the head P1h of the window-side occupant P1. That is, the front end surfaces of the right and left side portions 24 constitute part of the headrest 16.

Figure 3:
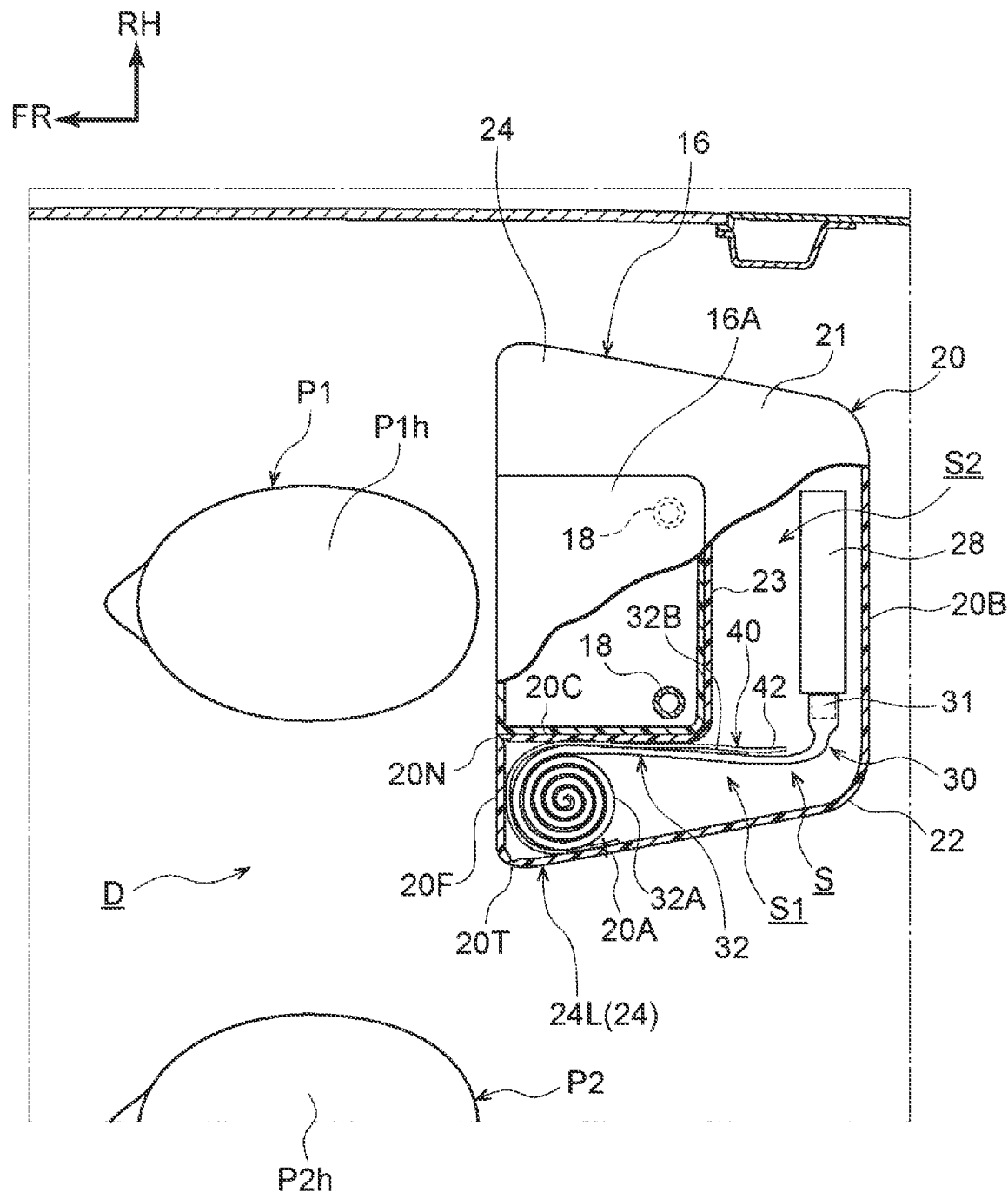
FIG. 3 is an expanded plan view illustrating a state before the deployment of the seat-mounted airbag device according to the first embodiment by partially cutting the seat-mounted airbag device.

Further, as illustrated in FIG. 3, right and left outer walls 20A (of the side portions 24) and a rear wall 20B in the casing portion 20 are generally constituted by a resin cover member 22 formed in a generally "U" shape in a plan view. In the casing portion 20, an upper wall (not illustrated), a lower wall (not illustrated), the front wall 20F, and an inner peripheral wall 20C facing the main body portion 16A are constituted by urethane foam 23, and the outer surfaces of the cover member 22 and the urethane foam 23 are integrally coated with a skin material 21.

A predetermined space S (including a storage portion S1 and an arrangement portion S2 described later) is formed inside the casing portion 20. An airbag body 32 of the airbag device 30 is accommodated in the storage portion S1 formed inside a side portion 24L on the outer side (the left side in the figure) of the casing portion 20 in the seat width direction, the outer side being a far side from the window side.

As illustrated in FIGS. 1, 2, the airbag device 30 includes the airbag body 32 configured to deploy forward from the rear side (more specifically, the left rear side) from the head P1h of the window-side occupant P1 sitting on the vehicle seat 10 when gas is emitted from an inflator 28 (see FIGS. 3, 4) (described later).

The airbag body 32 includes a front-rear chamber 34 placed in a gap D between the head P1h of the window-side occupant P1 and the head P2h of the central-side occupant P2, and a distal-end chamber 36 configured to deploy inwardly in the seat width direction from a front end part of the front-rear chamber 34 such that the distal-end chamber 36 is placed in front of the face (the head P1h) of the window-side occupant P1. The airbag body 32 includes a belt-shaped tether 38 by which a predetermined position in an upper end part of the front-rear chamber 34 is connected to a predetermined position in an upper end part of the distal-end chamber 36.

That is, the airbag body 32 is configured to be bent in a generally "V" shape in a plan view such that the airbag body 32 restrains at least part of the head P1h and the chest of the window-side occupant P1. Note that the tether 38 should be provided to connect at least the upper end part of the front-rear chamber 34 and the upper end part of the distal-end chamber 36 to each other, and the tether 38 may be further provided to connect a predetermined position in a lower end part of the front-rear chamber 34 to a predetermined position in a lower end part of the distal-end chamber 36, for example.

Figure 4:
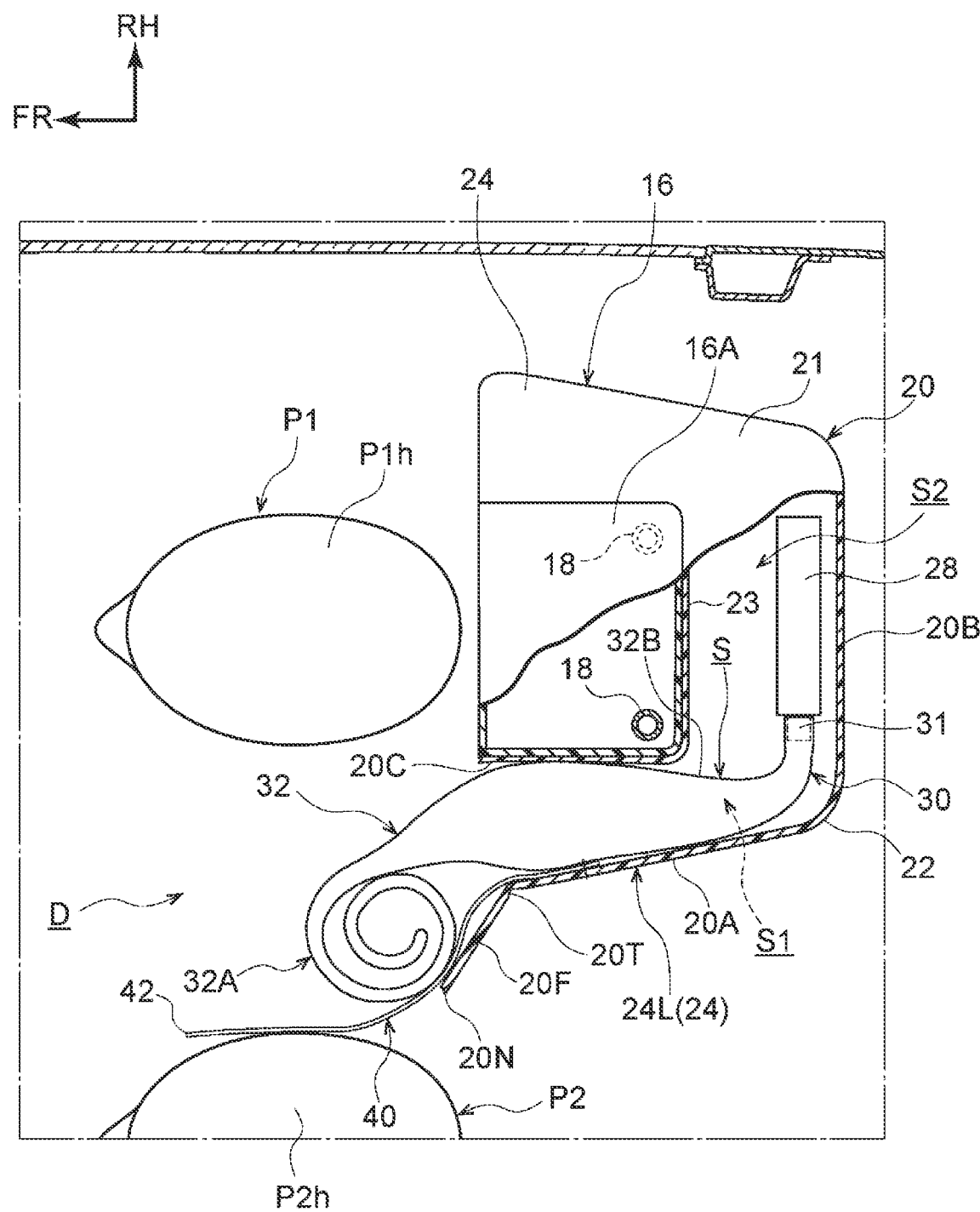
FIG. 4 is an expanded plan view illustrating a state in the middle of the deployment of the seat-mounted airbag device according to the first embodiment by partially cutting the seat-mounted airbag device.

As illustrated in FIGS. 3, 4, the inflator 28 is placed in the arrangement portion S2 that is a rear part of the space S formed in the casing portion 20. The inflator 28 is formed in a generally cylindrical shape, and an outer peripheral portion of the inflator 28 is supported by a reaction plate (not illustrated) formed in a housing shape via a retainer (not illustrated) such that a shaft center portion of the inflator 28 is placed along the seat width direction.

The reaction plate is fixed to a seatback frame (not illustrated) via a bracket (not illustrated), for example, and is configured to receive a reaction force transmitted via the inflator 28 from the airbag body 32 to deploy forward. Note that the reaction plate and the retainer are also placed in the arrangement portion S2.

The inflator 28 is electrically connected to an airbag ECU (not illustrated) provided in the vehicle, and a detection device (not illustrated) such as an acceleration sensor that is provided in the vehicle is electrically connected to the airbag ECU. Accordingly, when a front end collision of the vehicle is detected by the detection device, the inflator 28 is actuated via the airbag ECU such that the inflator 28 emits gas instantly.

Note that, instead of the configuration where the inflator 28 is actuated in response to the detection of the front end collision of the vehicle, the inflator 28 may be configured to be actuated when a collision of the vehicle is predicted by a detection device (not illustrated) such as a collision prediction sensor. A connecting portion 31 of the airbag body 32 is fitted in an emission outlet of the inflator 28 in a connected manner.

Further, the airbag body 32 is configured such that about ⅓ of an upper part of the airbag body 32 in its height direction is folded downward, and then, the airbag body 32 is wound outwardly sequentially from its distal end side in a roll shape with its axial direction being along the seat up-down direction. That is, the airbag body 32 is accommodated in the storage portion S1 formed in the side portion 24L in a state where the airbag body 32 includes a roll-shaped outward winding portion 32A on the outer side of the airbag body 32 in the seat width direction in a plan view (see FIG. 3).

Accordingly, as illustrated in FIG. 4, the airbag body 32 is configured such that, while the outward winding portion 32A wound outwardly in a roll shape is loosening by gas emitted from the inflator 28, the airbag body 32 deploys forward from the side portion 24L through the gap D between the head P1h of the window-side occupant P1 and the head P2h of the central-side occupant P2, and after that, the upper part folded downward deploys upward.

Note that the reason why the upper part of the airbag body 32 is folded downward and then wound outwardly in a roll shape is because the height of the side portion 24L (the casing portion 20) is lower than the height of the deployed airbag body 32. In other words, the storage portion S1 is formed such that its height is slightly higher than the height of the airbag body 32 in a state where its upper part is folded downward.

Further, the front wall 20F constituting the front end surface of the side portion 24L is configured to break linearly along the up-down direction, for example, along with the deployment of the airbag body 32. In some embodiments, a breakage part may be an inner end part 20N of the front wall 20F in the seat width direction. In other words, a vulnerable portion or the like that is easily broken may be formed in the inner end part 20N of the front wall 20F in the seat width direction.

In a case where the breakage part is the inner end part 20N of the front wall 20F in the seat width direction, the front wall 20F is to be opened with an outer end part 20T of the front wall 20F in the seat width direction being used as a hinge portion. Accordingly, it is possible to further restrain the airbag body 32 to deploy from making contact with the head P2*h* of the central-side occupant P2.

Further, as illustrated in FIG. 3, in the storage portion S1 formed in the side portion 24L, fabric (hereinafter referred to as a "guidance fabric") 42 is provided as a guidance member 40 configured to project from the side portion 24L (the storage portion S1) prior to the deployment of the airbag body 32 such that the guidance member 40 is disposed between the airbag body 32 and the head P2*h* of the central-side occupant P2. Note that, in FIGS. 1, 2, the guidance fabric 42 is not illustrated.

A first end part of the guidance fabric 42 is fixed to the inner surface of the outer wall 20A in the side portion 24L by adhesive, rivet, or the like. A second end part of the guidance fabric 42 passes through between the inner surface of the front wall 20F and the outward winding portion 32A of the airbag body 32 accommodated in a state where the outward winding portion 32A is wound outwardly and between the inner surface of the inner peripheral wall 20C of the casing portion 20 and the outer surface of an inner side wall 32B of the airbag body 32 in the seat width direction, such that the second end part of the guidance fabric 42 is placed along the outer surface of the inner side wall 32B.

Accordingly, as illustrated in FIG. 4, when gas is emitted from the inflator 28 and the airbag body 32 is to deploy by breaking the inner end part 20N of the front wall 20F in the seat width direction, the second end part side of the guidance fabric 42 is pushed by the airbag body 32 such that the second end part side of the guidance fabric 42 projects from the side portion 24L (the storage portion S1), and hereby, the guidance fabric 42 is disposed between the airbag body 32 and the head P2*h* of the central-side occupant P2.

In some embodiments, the length of the guidance fabric 42 along its projection direction be a length that can cover the right side of the face of the central-side occupant P2 in a plan view. In some embodiments, the height of the guidance fabric 42 (the length along the up-down direction) may be a height that can cover the right side of the face of the central-side occupant P2, and the height of the guidance fabric 42 may be about 250 mm to 300 mm, for example.

In some embodiments, the guidance fabric 42 may be higher in rigidity than the airbag body 32, and the guidance fabric 42 may be a coating fabric in which a material (a base cloth) constituting the airbag body 32 is coated with silicone rubber or the like. However, the guidance fabric 42 is not limited to this, and the guidance fabric 42 may be made of the same material as the airbag body 32, for example.

Further, although detailed illustrations are omitted, a non-expansion portion extending in the up-down direction is formed by sewing in a generally central part, in the front-rear direction, of the airbag body 32 in a state where no gas is filled into the airbag body 32. Due to the non-expansion portion, the distal-end chamber 36 can be bent inwardly in the seat width direction from the front-rear chamber 34, so that the distal-end chamber 36 can deploy inwardly in the seat width direction. That is, an upstream side of the airbag body 32 in its deployment direction from the non-expansion portion serves as the front-rear chamber 34, and a downstream side of the airbag body 32 in the deployment direction from the non-expansion portion serves as the distal-end chamber 36.

Next will be described an operation of the airbag device 30 according to the first embodiment configured as described above.

When the detection device detects a front collision of the vehicle, the inflator 28 is actuated so that gas is instantly emitted into the airbag body 32. When gas is emitted into the airbag body 32, the airbag body 32 deploys, but before the deployment of the airbag body 32, the guidance fabric 42 projects from the side portion 24L. That is, the inner end part 20N of the front wall 20F in the seat width direction is broken by being pressed by the airbag body 32 to deploy from the storage portion S1 side, so that the second end part side of the guidance fabric 42 is pushed out of the side portion 24L (the storage portion S1).

Hereby, the guidance fabric 42 is first disposed between the airbag body 32 and the head P2*h* of the central-side occupant P2. Then, inwardly from the guidance fabric 42 in the seat width direction, the airbag body 32 deploys forward from the side portion 24L through the gap D between the head P1*h* of the window-side occupant P1 and the head P2*h* of the central-side occupant P2 (the guidance fabric 42).

Note that, at this time, the airbag body 32 deploys forward while the outward winding portion 32A wound outwardly is loosening, and therefore, the airbag body 32 deploys to a side closer to the head P2*h* of the central-side occupant P2. Accordingly, at the time of the deployment of the airbag body 32, it is possible to retrain or prevent the airbag body 32 from hitting (interfering with) the head P1*h* of the window-side occupant P1. This makes it possible to retrain or prevent the face of the window-side occupant P1 from being damaged by the airbag body 32 to deploy.

Even when the head P1*h* of the window-side occupant P1 approaches the side closer to the head P2*h* of the central-side occupant P2 such that the gap D between the head P1*h* of the window-side occupant P1 and the head P2*h* of the central-side occupant P2 is narrowed, for example, the guidance fabric 42 can retrain or prevent the airbag body 32 from hitting (interfering with) the head P2*h* of the central-side occupant P2.

That is, the guidance fabric 42 projects prior to the airbag body 32 and is disposed between the airbag body 32 and the head P2*h* of the central-side occupant P2. Accordingly, even when the airbag body 32 deploys to the side closer to the head P2*h* of the central-side occupant P2 at the time when the airbag body 32 deploys, there is no risk that the face of the central-side occupant P2 is damaged by the airbag body 32 to deploy. In other words, when the airbag body 32 deploys, the face of the central-side occupant P2 can be protected by the guidance fabric 42.

Besides, the guidance member 40 configured to project prior to the airbag body 32 is constituted by the guidance fabric 42. Accordingly, in comparison with a case where the guidance member 40 is made of plastic, for example, even when the guidance member 40 (the guidance fabric 42) hits the head P2*h* of the central-side occupant P2, the head P2*h* (the face) is hardly damaged. In other words, since the guidance member 40 is the guidance fabric 42, it is possible to reduce damage to the head P2*h* of the central-side occupant P2 as much as possible.

Thus, the deployment behavior of the airbag body 32 is controlled by the outward winding portion 32A and the guidance fabric 42 such that the airbag body 32 does not hit the head P1*h* of the window-side occupant P1 and the head P2*h* of the central-side occupant P2. Accordingly, as described above, there is no risk that the airbag body 32 to deploy hits and damages the head P1h of the window-side occupant P1 and the head P2h of the central-side occupant P2, and the airbag body 32 can deploy smoothly by being guided by the guidance fabric 42.

Then, the airbag body 32 that has completely deployed can restrict at least part of the head P1h and the chest of the window-side occupant P1 sitting on the vehicle seat 10. In other words, the airbag body 32 can restrain the head P1h and the chest of the window-side occupant P1 from at least partially moving forward by inertia force at the time of a front end collision of the vehicle.

Note that the airbag body 32 includes the outward winding portion 32A formed such that the upper part of the airbag body 32 is folded downward and then wound outwardly in a roll shape. Accordingly, at the time when the airbag body 32 deploys forward from the side portion 24L through the gap D between the head P1h of the window-side occupant P1 and the head P2h of the central-side occupant P2 (the guidance fabric 42) due to gas emitted from the inflator 28, the outward winding portion 32A wound outwardly in a roll shape loosens and deploys first, and then, the upper part folded downward deploys upward.

Accordingly, the airbag body 32 including the outward winding portion 32A formed such that the upper part of the airbag body 32 is folded downward and then wound outwardly in a roll shape can deploy forward more quickly and can complete its deployment at an early stage in comparison with an airbag body (not illustrated) configured such that the airbag body is wound outwardly in a roll shape, and then, its upper part is folded downward, for example.

Further, the side portion 24L in which the airbag body 32 is accommodated is provided on the outer side, in the seat width direction, of the main body portion 16A of the headrest 16 in the window-side vehicle seat 10, the outer side being a far side from the window side. Accordingly, when the airbag body 32 deploys forward from the side portion 24L, there is no risk that the deployment of the airbag body 32 is inhibited by a seat belt (a shoulder belt) (not illustrated) or a curtain airbag (not illustrated) placed on the window side.

Second Embodiment

Next will be described the airbag device 30 according to a second embodiment. Note that a portion equivalent to a portion in the first embodiment has the same reference sign as the portion in the first embodiment, and detailed descriptions thereof (including common operations) are omitted appropriately.

Figure 5:
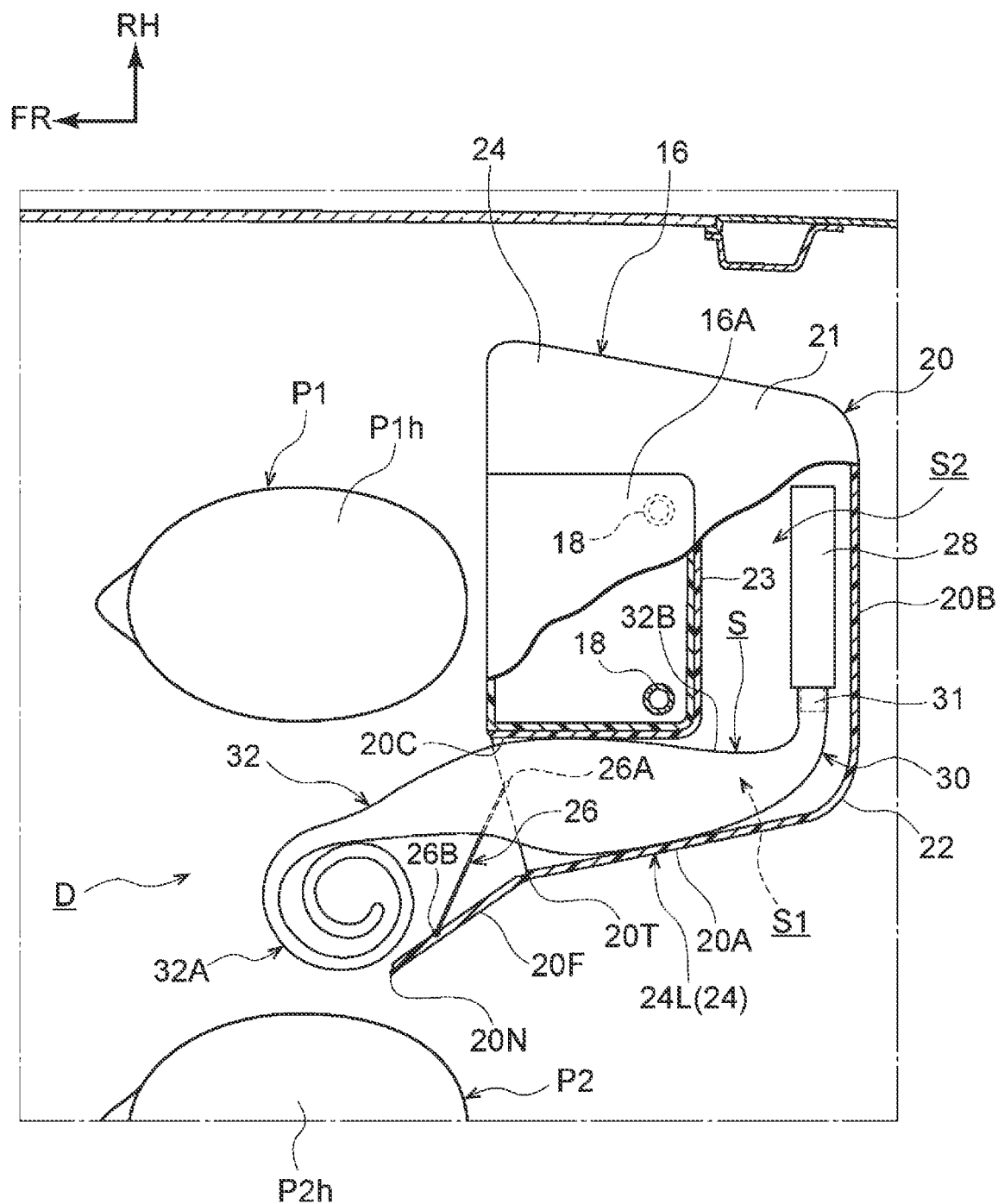
FIG. 5 is an expanded plan view illustrating a state in the middle of the deployment of a seat-mounted airbag device according to a second embodiment by partially cutting the seat-mounted airbag device.

As illustrated in FIG. 5, the second embodiment is different from the first embodiment only in that the guidance fabric 42 is not provided, and the guidance member 40 is constituted only by the front wall 20F. That is, the front wall 20F where the inner end part 20N in the seat width direction is broken along with the deployment of the airbag body 32 is opened with the outer end part 20T in the seat width direction being used as a hinge portion such that the front wall 20F is disposed between the airbag body 32 to deploy and the head P2h of the central-side occupant P2.

The front wall 20F is configured to be opened only to a predetermined angle at which the airbag body 32 can deploy, by a string-shaped member 26 serving as a stopper member. More specifically, a first end part 26A of the string-shaped member 26 is attached to a generally central part, in the width direction, of a lower wall of the side portion 24L, and a second end part 26B of the string-shaped member 26 is attached to a generally central part, in the width direction, of a lower end part of the front wall 20F. Then, the length of the string-shaped member 26 is set such that the front wall 20F is opened only to generally 90 degrees in a plan view.

Accordingly, at the time when the airbag body 32 deploys forward from the side portion 24L through the gap D between the head P1h of the window-side occupant P1 and the head P2h of the central-side occupant P2 due to gas emitted from the inflator 28, the front wall 20F opened only at the predetermined angle restrains or prevents the airbag body 32 from hitting and damaging the head P2h of the central-side occupant P2, and the airbag body 32 can deploy smoothly.

Further, like the second embodiment, when the guidance member 40 is constituted only by the front wall 20F of the side portion 24L, it is possible to reduce the manufacturing cost of the guidance member 40 and the casing portion 20 in comparison with a case where the guidance member 40 is provided separately from the front wall 20F of the side portion 24L, e.g., a case where the guidance member 40 is constituted only by the guidance fabric 42.

Further, due to the string-shaped member 26, the front wall 20F is configured to be opened only to the predetermined angle (generally 90 degrees in a plan view) at which the airbag body 32 can deploy. Accordingly, it is possible to prevent such a situation that the front wall 20F is opened at an angle larger than the predetermined angle and hits and damages the head P2h of the central-side occupant P2.

Third Embodiment

Next will be described the airbag device 30 according to a third embodiment. Note that a portion equivalent to portions in the first embodiment and the second embodiment has the same reference sign as the portions in the first embodiment and the second embodiment, and detailed descriptions thereof (including common operations) are omitted appropriately.

Figure 6:
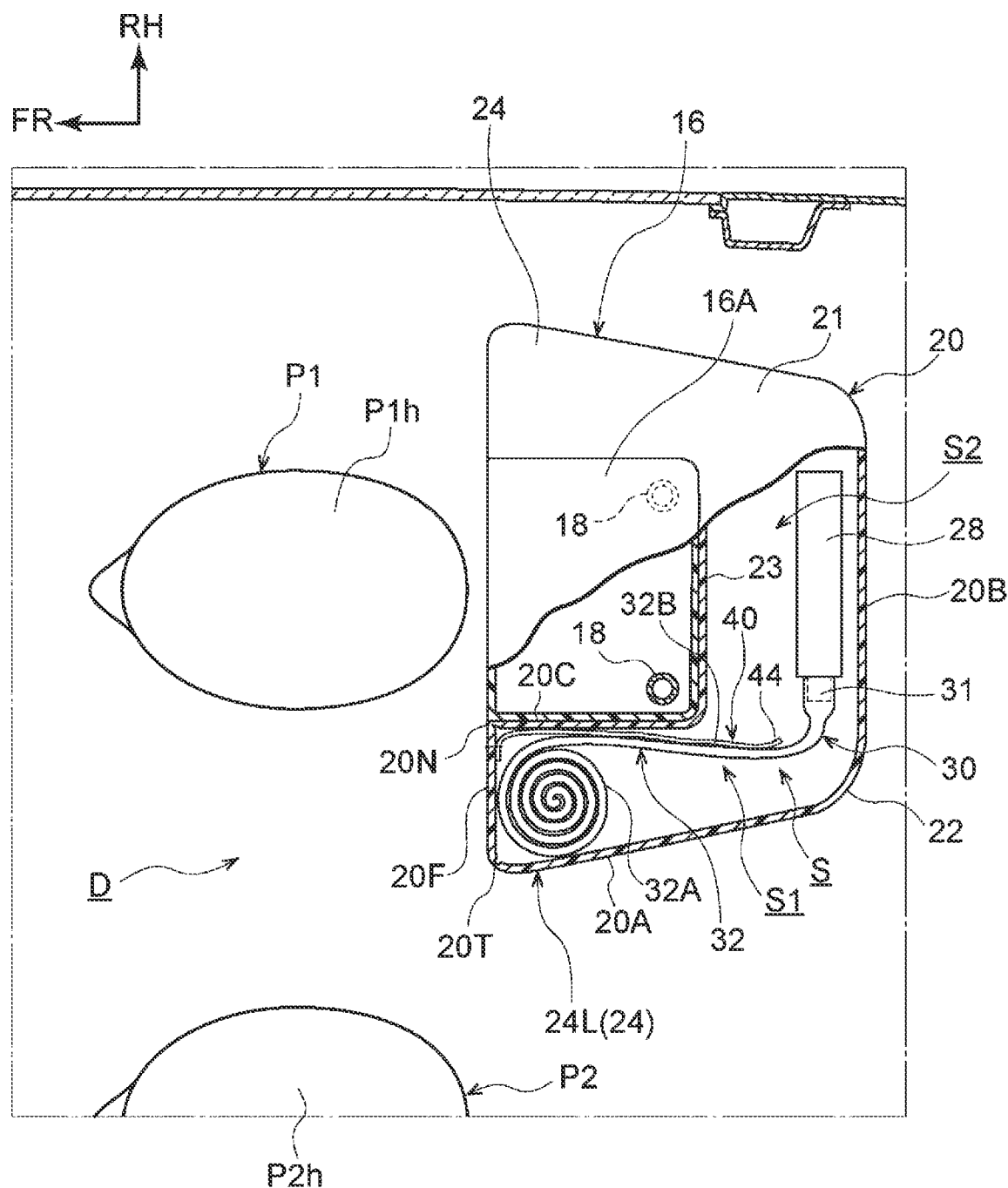
FIG. 6 is an expanded plan view illustrating a state before the deployment of a seat-mounted airbag device according to a third embodiment by partially cutting the seat-mounted airbag device.
Figure 7:
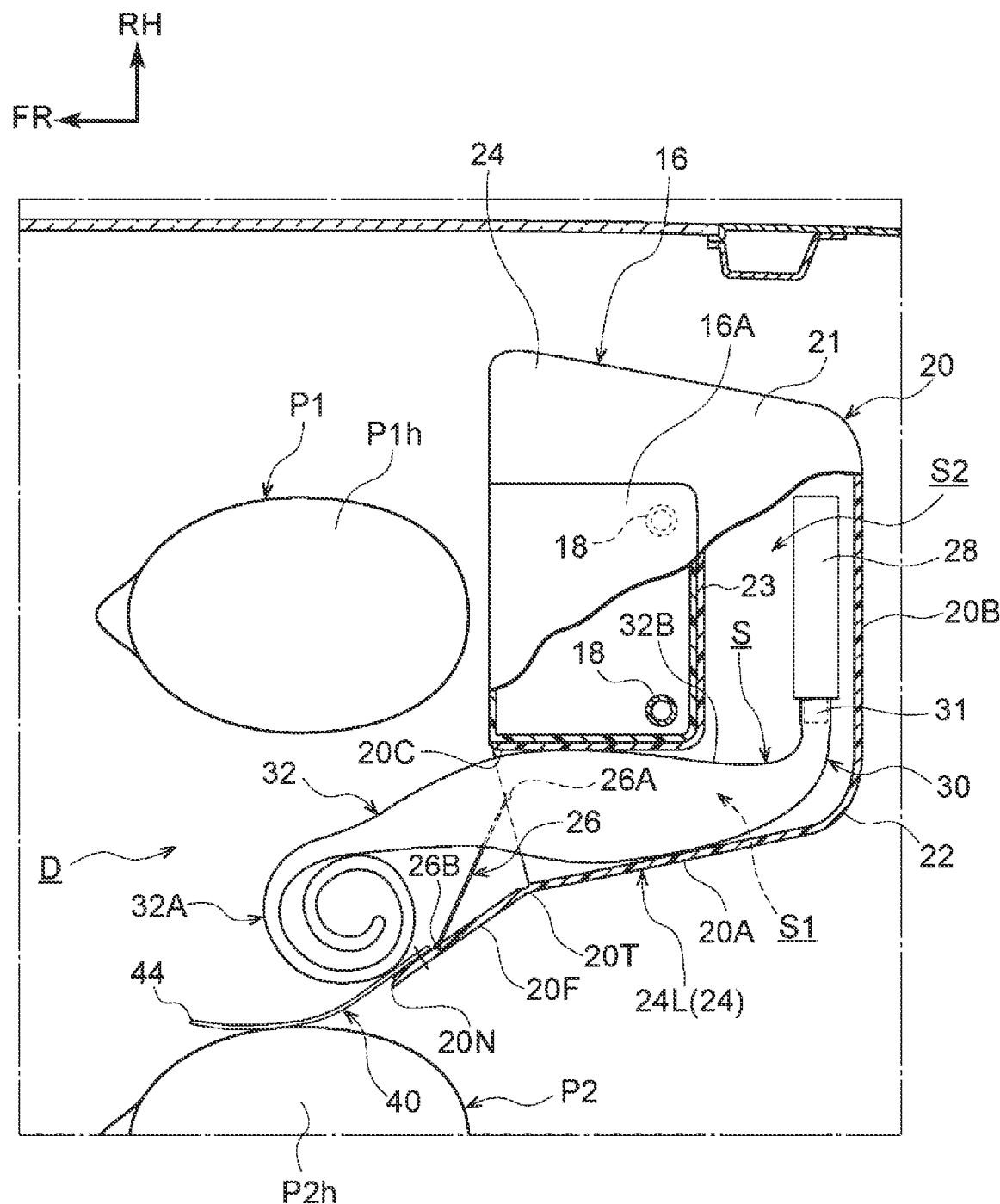
FIG. 7 is an expanded plan view illustrating a state in the middle of the deployment of the seat-mounted airbag device according to the third embodiment by partially cutting the seat-mounted airbag device.

As illustrated in FIGS. 6, 7, the third embodiment is different from the first embodiment and the second embodiment only in that a guidance fabric 44 is provided in the inner end part 20N of the front wall 20F in the seat width direction. That is, the guidance member 40 in the third embodiment is constituted by the front wall 20F and the guidance fabric 44.

The guidance fabric 44 is different from the guidance fabric 42 in that the length of the guidance fabric 44 in its projection direction is shorter than that of the guidance fabric 42, and the height of the guidance fabric 44 (the length along the up-down direction) is the same as that of the guidance fabric 42. A first end part of the guidance fabric 44 is attached to the inner end part 20N of the front wall 20F in the seat width direction by sewing or the like, and a second end part of the guidance fabric 44 passes through between the inner surface of the inner peripheral wall 20C of the casing portion 20 and the outer surface of the inner side wall 32B of the airbag body 32 in the seat width direction such that the second end part of the guidance fabric 44 is placed along the outer surface of the inner side wall 32B.

Note that, in this state, the second end part of the guidance fabric 44 is placed at the same position as the second end part of the guidance fabric 42. In other words, the length of the guidance fabric 44 along its projection direction is set such that the second end part of the guidance fabric 44 that is placed along the outer surface of the inner side wall 32B of the airbag body 32 in the seat width direction is placed at the same position as the second end part of the guidance fabric 42.

In a case of the guidance member 40 configured as such, the inner end part 20N of the front wall 20F in the seat width direction in the side portion 24L is broken by the airbag body 32 to deploy, and the front wall 20F pivots with the outer end part 20T of the front wall 20F in the seat width direction being used as a hinge portion, so that the second end part side of the guidance fabric 44 is pushed out of the side portion 24L (the storage portion S1), as illustrated in FIG. 7.

Hereby, the front wall 20F and the guidance fabric 44 are disposed between the airbag body 32 and the head P2$h$ of the central-side occupant P2, and the airbag body 32 deploys forward from the side portion 24L through the gap D between the head P1$h$ of the window-side occupant P1 and the head P2$h$ of the central-side occupant P2, on the inner side in the seat width direction from the front wall 20F and the guidance fabric 44. That is, the airbag body 32 deploys forward while the outward winding portion 32A wound outwardly in a roll shape is loosening.

Accordingly, at the time of the deployment of the airbag body 32, it is possible to retrain or prevent the airbag body 32 from hitting (interfering with) the head P1$h$ of the window-side occupant P1 and also to restrain or prevent the airbag body 32 from hitting (interfering with) the head P2$h$ of the central-side occupant P2. That is, the deployment behavior of the airbag body 32 is controlled such that the airbag body 32 does not directly hit the head P1$h$ of the window-side occupant P1 and the head P2$h$ of the central-side occupant P2. Therefore, there is no risk that the airbag body 32 to deploy hits and damages the head P1$h$ of the window-side occupant P1 and the head P2$h$ of the central-side occupant P2, and the airbag body 32 can deploy smoothly by being guided by the front wall 20F and the guidance fabric 44.

Further, like the third embodiment, when the guidance member 40 is constituted by the front wall 20F of the side portion 24L and the guidance fabric 44 provided in the front wall 20F, it is possible to reduce the manufacturing cost of the guidance member 40 and the casing portion 20 in comparison with a case where the guidance member 40 is constituted only by the guidance fabric 42, for example. In comparison with a case where the guidance member 40 is constituted only by the front wall 20F of the side portion 24L, for example, it is possible to guide the airbag body 32 to deploy to an appropriate region ahead of the front wall 20F.

Fourth Embodiment

Next will be described the airbag device 30 according to a fourth embodiment. Note that a portion equivalent to a portion in the first embodiment has the same reference sign as the portion in the first embodiment, and detailed descriptions thereof (including common operations) are omitted appropriately.

Figure 8:
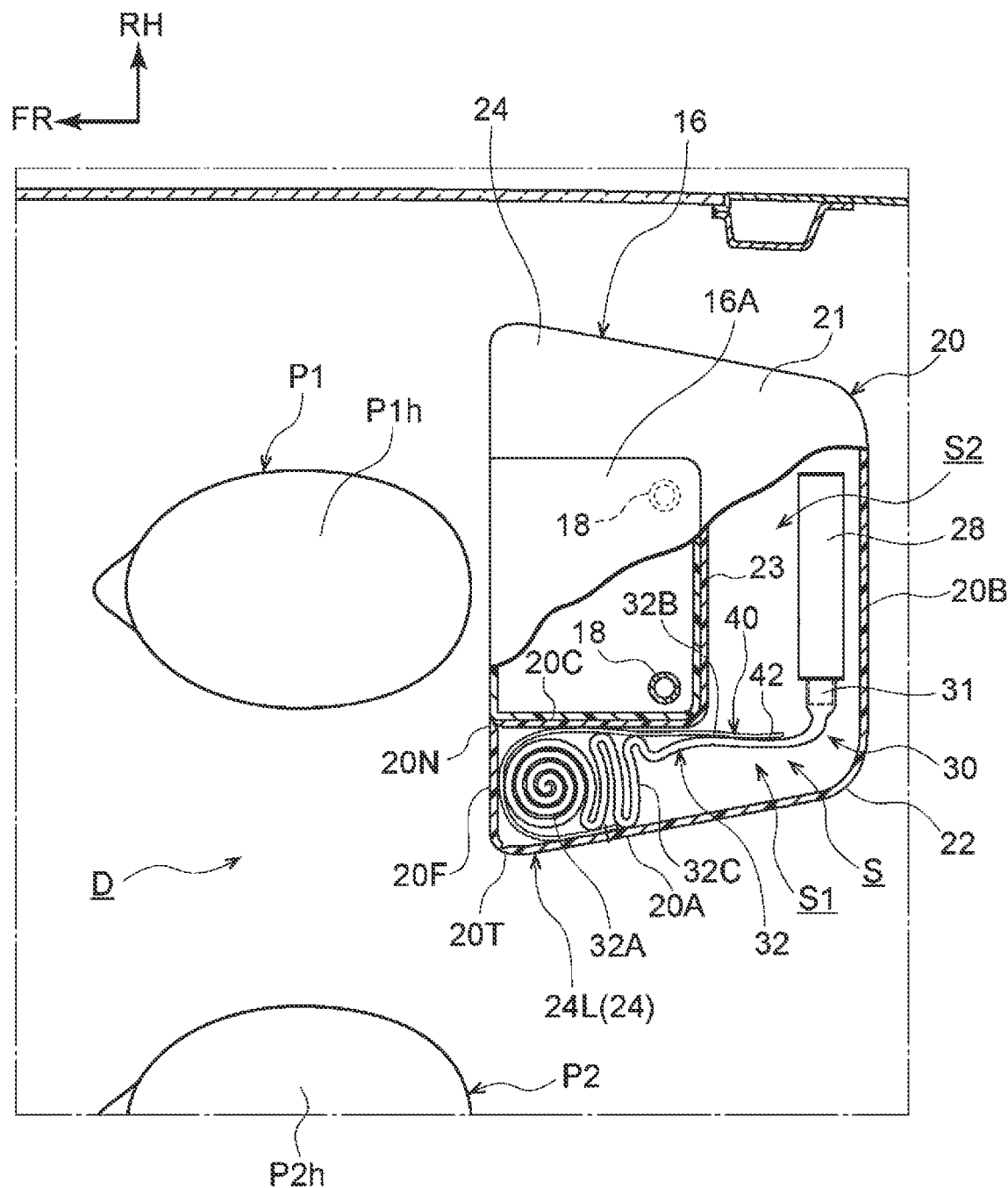
FIG. 8 is an expanded plan view illustrating a state before the deployment of a seat-mounted airbag device according to a fourth embodiment by partially cutting the seat-mounted airbag device.

As illustrated in FIG. 8, the fourth embodiment is different from the first embodiment only in that the airbag body 32 of the airbag device 30 includes a bellows portion 32C formed continuously with the upstream side of the outward winding portion 32A in the deployment direction, in addition to the outward winding portion 32A wound outwardly in a roll shape.

That is, the airbag body 32 is accommodated in the storage portion S1 in a state where the airbag body 32 includes the bellows portion 32C folded in a bellows shape (alternately folded several times with a predetermined length) in a plan view continuously with the outward winding portion 32A toward the upstream side in the deployment direction. Note that the bellows portion 32C illustrated herein includes only two folded parts (a part folded in two is considered as one folded part). However, the bellows portion 32C is not limited to this, and three or more folded parts may be formed.

Thus, in a case where the outward winding portion 32A and the bellows portion 32C are formed in the airbag body 32 sequentially from the downstream side in the deployment direction, when the airbag body 32 deploys forward from the side portion 24L through the gap D between the head P1$h$ of the window-side occupant P1 and the head P2$h$ of the central-side occupant P2 due to gas emitted from the inflator 28, the bellows portion 32C loosens and deploys first, and then, the outward winding portion 32A loosens and deploys.

Here, generally, it is known that the bellows shape loosens more quickly than the roll shape (a resisting force against deployment is smaller in the bellows shape than in the roll shape). Accordingly, in comparison with a case where the airbag body 32 accommodated in the storage portion S1 includes only the outward winding portion 32A, the airbag body 32 including the outward winding portion 32A and the bellows portion 32C formed sequentially from the downstream side in the deployment direction can deploy forward more quickly.

However, in a case where the airbag body 32 includes only the outward winding portion 32A, the airbag body 32 can be manufactured by simply forming the outward winding portion 32A, and therefore, the airbag body 32 can be easily accommodated in the storage portion S1, in comparison with a case where the airbag body 32 includes the outward winding portion 32A and the bellows portion 32C. That is, in a case where the airbag body 32 includes only the outward winding portion 32A, the airbag body 32 accommodated in the storage portion S1 can be easily manufactured.

Fifth Embodiment

Finally described is the airbag device 30 according to a fifth embodiment. Note that a portion equivalent to a portion in the first embodiment has the same reference sign as the portion in the first embodiment, and detailed descriptions thereof (including common operations) are omitted appropriately.

Figure 9:
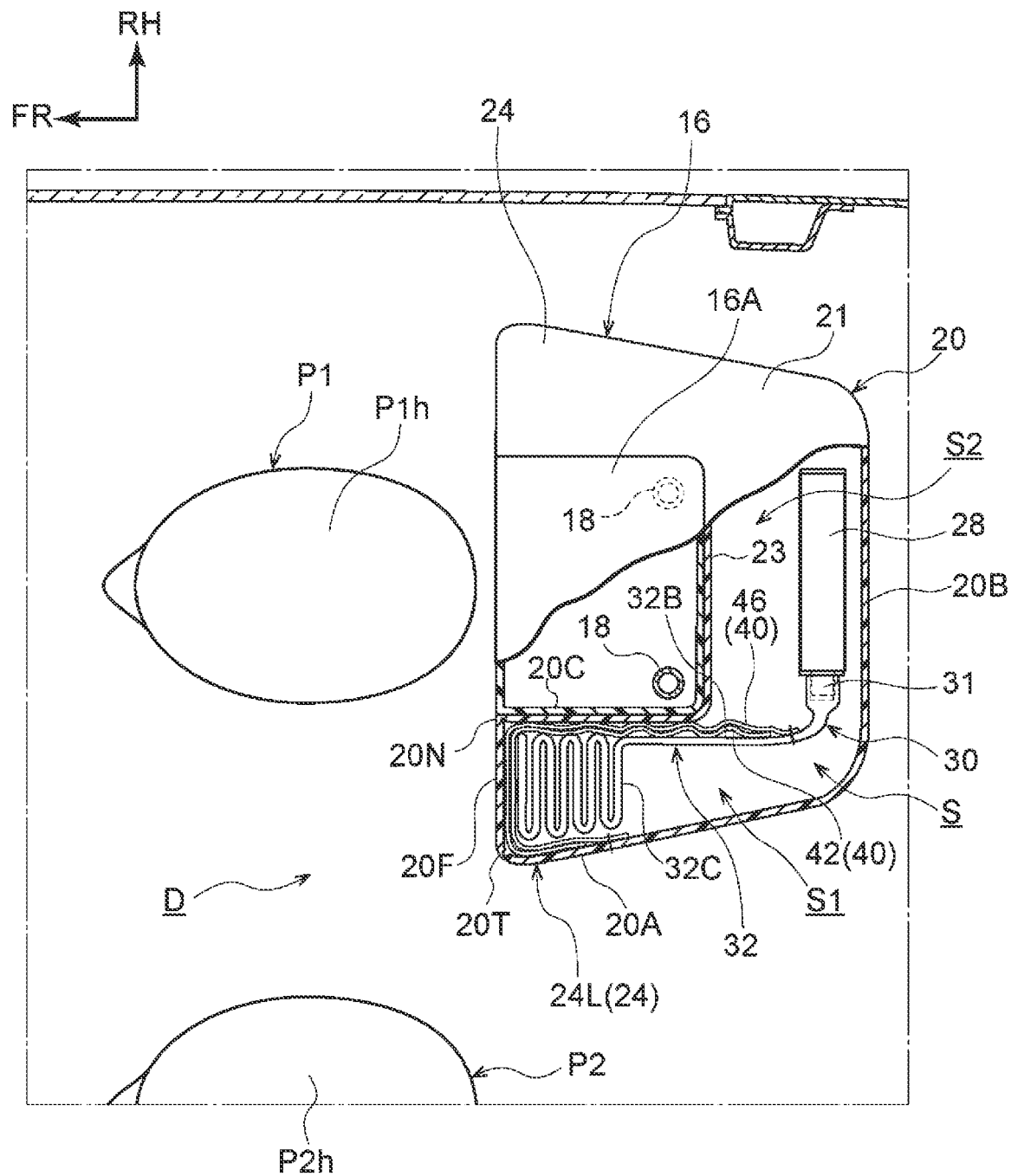
FIG. 9 is an expanded plan view illustrating a state before the deployment of a seat-mounted airbag device according to a fifth embodiment by partially cutting the seat-mounted airbag device.
Figure 10:
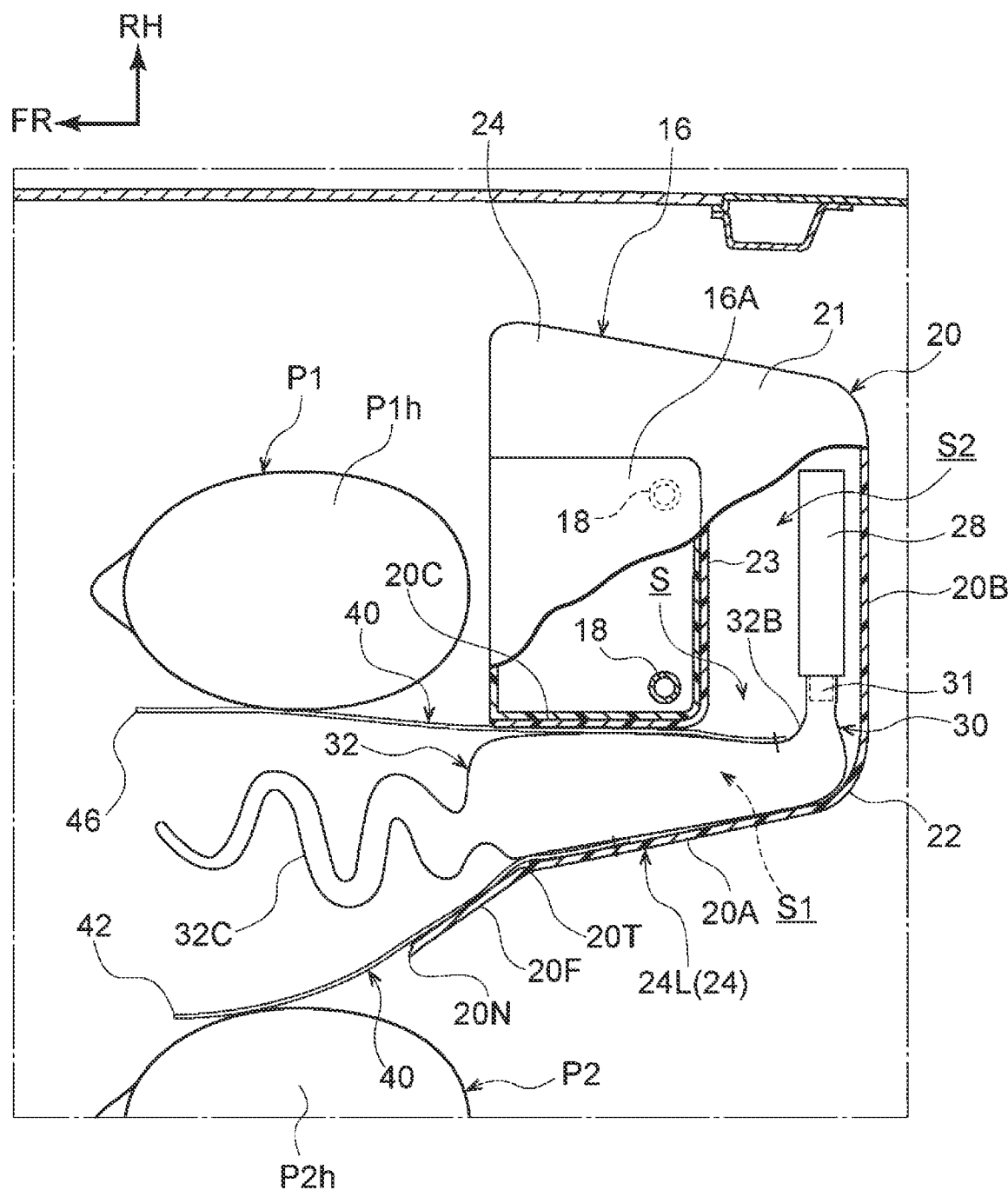
FIG. 10 is an expanded plan view illustrating a state in the middle of the deployment of the seat-mounted airbag device according to the fifth embodiment by partially cutting the seat-mounted airbag device.

As illustrated in FIGS. 9, 10, the fifth embodiment is different from the first embodiment only in that the airbag body 32 of the airbag device 30 is accommodated in a state where the airbag body 32 is folded in a bellows shape instead of a roll shape and that a guidance fabric 46 as the guidance member 40 is also disposed between the airbag body 32 and the head P1$h$ of the window-side occupant P1.

That is, the airbag body 32 is accommodated in the side portion 24L in a state where the airbag body 32 includes only the bellows portion 32C folded in a bellows shape (alternately folded several times with a predetermined length) in a plan view. Separately from the guidance fabric 42, the guidance fabric 46 similar to the guidance fabric 42 is provided such that a first end part of the guidance fabric 46 is attached by sewing or the like to a part near the connecting portion 31 in the inner side wall 32B of the airbag body 32 in the seat width direction.

In some embodiments, the guidance fabric 46 may deploy prior to the guidance fabric 42. Accordingly, as illustrated in FIG. 9, the guidance fabric 46 is placed outwardly from the guidance fabric 42 (to cover the guidance fabric 42) and accommodated in the side portion 24L. More specifically, a second end part of the guidance fabric 46 passes through between the guidance fabric 42 and the inner surface of the inner peripheral wall 20C and between the guidance fabric 42 and the inner surface of the front wall 20F such that the second end part of the guidance fabric 46 is placed on the inner surface of the outer wall 20A.

In a case of the guidance member 40 configured as such, as illustrated in FIG. 10, when the inner end part 20N of the front wall 20F in the seat width direction in the side portion 24L is broken by the airbag body 32 to deploy, and the front wall 20F pivots with the outer end part 20T of the front wall 20F in the seat width direction being used as a hinge portion, the second end part side of the guidance fabric 46 is pushed out of the side portion 24L (the storage portion S1) first, and then, the second end part side of the guidance fabric 42 is pushed out of the side portion 24L (the storage portion S1).

Hereby, the guidance fabric 46 is disposed between the airbag body 32 and the head P1h of the window-side occupant P1, and the guidance fabric 42 is disposed between the airbag body 32 and the head P2h of the central-side occupant P2. Then, between the guidance fabric 46 and the guidance fabric 42, the airbag body 32 deploys forward from the side portion 24L through the gap D between the head P1h of the window-side occupant P1 (the guidance fabric 46) and the head P2h of the central-side occupant P2 (the guidance fabric 42). That is, the airbag body 32 deploys forward while the bellows portion 32C folded in a bellows shape is loosening.

Accordingly, at the time when the airbag body 32 deploys, even when the head P1h of the window-side occupant P1 approaches the side closer to the head P2h of the central-side occupant P2 such that the gap D between the head P1h of the window-side occupant P1 and the head P2h of the central-side occupant P2 is narrowed, for example, it is possible to retrain or prevent, by the guidance fabric 46, the airbag body 32 from hitting (interfering with) the head P1h of the window-side occupant P1 and also to restrain or prevent, by the guidance fabric 42, the airbag body 32 from hitting (interfering with) the head P2h of the central-side occupant P2.

That is, the deployment behavior of the airbag body 32 is controlled by the guidance fabric 46 and the guidance fabric 42 such that the airbag body 32 does not directly hit the head P1h of the window-side occupant P1 and the head P2h of the central-side occupant P2. Accordingly, there is no risk that the airbag body 32 to deploy hits and damages the head P1h of the window-side occupant P1 and the head P2h of the central-side occupant P2, and the airbag body 32 can deploy smoothly by being guided by the guidance fabric 46 and the guidance fabric 42.

Further, generally, it is known that the bellows shape loosens more quickly than the roll shape (a resisting force against deployment is smaller in the bellows shape than in the roll shape). Accordingly, the airbag body 32 in the fifth embodiment can deploy forward more quickly than the airbag body 32 in the first embodiment that is accommodated in the side portion 24L in a state where the airbag body 32 includes only the outward winding portion 32A.

The seat-mounted airbag device 30 according to the present embodiment has been described above based on the drawings, but the seat-mounted airbag device 30 according to the present embodiment is not limited to the one illustrated herein, and various modifications in design can be made appropriately within a range that does not beyond the gist of the present disclosure. For example, the reaction plate configured to support the inflator 28 may be fixed to the headrest support 18 via a bracket instead of the seatback frame.

Further, the guidance member 40 is not limited to a member constituted by the guidance fabric 42, the front wall 20F, the front wall 20F and the guidance fabric 44, or the guidance fabric 42 and the guidance fabric 46. The guidance member 40 may have any configuration, provided that the guidance member 40 projects from the side portion 24L prior to the deployment of the airbag body 32 such that the guidance member 40 is disposed between the airbag body 32 and the head P2h of the central-side occupant P2, and in addition, in the case of the fifth embodiment, the guidance fabric 40 is disposed between the airbag body 32 and the head P1h of the window-side occupant P1.

For example, the guidance member 40 may be constituted by a soft resin sheet-shaped member configured such that the sheet-shaped member projects by sliding along the inner surface of the outer wall 20A of the casing portion 20 along with the deployment of the airbag body 32 so as to be disposed between the airbag body 32 and the head P2h of the central-side occupant P2, and in addition, in the case of the fifth embodiment, the sheet-shaped member projects by sliding along the inner surface of the inner peripheral wall 20C of the casing portion 20 so as to be disposed between the airbag body 32 and the head P1h of the window-side occupant P1.

Further, the casing portion 20 in which the airbag device 30 is accommodated should be provided such that the side portion 24L is placed on the outer side in the seat width direction, the outer side being a far side from the window side of the main body portion 16A of the headrest 16. Accordingly, the casing portion 20 may be provided, for example, in the seatback 14. That is, the side portion 24L may be provided in the upper end part of the seatback 14 on the outer side in the seat width direction, the outer side being a far side from the window side of the main body portion 16A of the headrest 16.

Further, how to fold the airbag body 32 in the airbag device 30 according to any of the first to fourth embodiments is not limited to the folding method described above. For example, an airbag body (not illustrated) in which an outward winding portion is formed by being wound outwardly sequentially from the distal end side in a roll shape with its axis direction being along the seat up-down direction, and then, an upper part of the outward winding portion is folded downward may be accommodated in the side portion 24L.

At the time when the airbag body in this case deploys forward from the side portion 24L through the gap D between the head P1h of the window-side occupant P1 and the head P2h of the central-side occupant P2 due to gas emitted from the inflator 28, the upper part folded downward deploys upward first, and subsequently, the airbag body deploys forward while the outward winding portion wound outwardly in a roll shape is loosening.

Accordingly, even in a case where the gap D between the head P1h of the window-side occupant P1 and the head P2h of the central-side occupant P2 is narrow, the airbag body configured such that the airbag body is wound outwardly in a roll shape, and then, its upper part is folded downward easily passes through the gap D, in comparison with the airbag body 32 including the outward winding portion 32A formed such that the upper part of the airbag body 32 is folded downward and then wound outwardly in a roll shape.

In other words, with the airbag body configured such that the airbag body is wound outwardly in a roll shape, and then, its upper part is folded downward, it is possible to further restrain or prevent the occurrence of poor deployment caused due to the narrow gap D between the head P1*h* of the window-side occupant P1 and the head P2*h* of the central-side occupant P2.

What is claimed is:

1. A seat-mounted airbag device comprising:
   an airbag body including a front-rear chamber and a distal-end chamber and accommodated in a side portion in a state where the airbag body includes an outward winding portion wound outwardly in a roll shape with an axial direction being along a seat up-down direction, the side portion being provided on an outer side, in a seat width direction, of a headrest of a window-side vehicle seat, the outer side being a far side from a window side,
   the front-rear chamber being configured to, due to gas emitted from an inflator actuated in response to detection or prediction of a front end collision of a vehicle, deploy forward in a seat front-rear direction from the side portion such that the front-rear chamber passes through a gap between a head of an AM50 dummy sitting on the window-side vehicle seat and a head of an AM50 dummy sitting on a central-side vehicle seat and is disposed in the gap,
   the distal-end chamber being configured to deploy inwardly in the seat width direction from a front end part of the front-rear chamber in the seat front-rear direction such that the distal-end chamber is disposed in front of the head of the AM50 dummy sitting on the window-side vehicle seat in the seat front-rear direction; and
   a guidance member configured to project from the side portion prior to deployment of the airbag body such that the guidance member is disposed between the airbag body and the head of the AM50 dummy sitting on the central-side vehicle seat.

2. A seat-mounted airbag device comprising:
   an airbag body including a front-rear chamber and a distal-end chamber and accommodated in a side portion in a state where the airbag body includes a bellows portion folded in a bellows shape, the side portion being provided on an outer side, in a seat width direction, of a headrest of a window-side vehicle seat, the outer side being a far side from a window side,
   the front-rear chamber being configured to, due to gas emitted from an inflator actuated in response to detection or prediction of a front end collision of a vehicle, deploy forward in a seat front-rear direction from the side portion such that the front-rear chamber passes through a gap between a head of an AM50 dummy sitting on the window-side vehicle seat and a head of an AM50 dummy sitting on a central-side vehicle seat and is disposed in the gap,
   the distal-end chamber being configured to deploy inwardly in the seat width direction from a front end part of the front-rear chamber in the seat front-rear direction such that the distal-end chamber is disposed in front of the head of the AM50 dummy sitting on the window-side vehicle seat in the seat front-rear direction; and
   guidance members configured to project from the side portion prior to deployment of the airbag body such that a first one of the guidance members is disposed between the airbag body and the head of the AM50 dummy sitting on the window-side vehicle seat, and a second one of the guidance members is disposed between the airbag body and the head of the AM50 dummy sitting on the central-side vehicle seat.

3. The seat-mounted airbag device according to claim 1, wherein the airbag body accommodated in the side portion includes a bellows portion folded in a bellows shape continuously with the outward winding portion toward an upstream side from the outward winding portion in a deployment direction of the airbag body.

4. The seat-mounted airbag device according to claim 1, wherein the guidance member is made of fabric.

5. The seat-mounted airbag device according to claim 1, wherein:
   the guidance member disposed between the airbag body and the head of the AM50 dummy sitting on the central-side vehicle seat is constituted by a front wall of the side portion; and
   the front wall is configured to be opened, by a stopper member, only to a predetermined angle that allows the airbag body to deploy.

6. The seat-mounted airbag device according to claim 5, wherein the guidance member disposed between the airbag body and the head of the AM50 dummy sitting on the central-side vehicle seat is constituted by the front wall and fabric provided in the front wall.

* * * * *